(12) United States Patent
Akiyama (10) Patent No.: US 8,596,795 B2
(45) Date of Patent: Dec. 3, 2013

(54) PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 335 days.

(21) Appl. No.: 13/155,862

(22) Filed: Jun. 8, 2011

(65) Prior Publication Data

US 2012/0002173 A1    Jan. 5, 2012

(30) Foreign Application Priority Data

Jul. 2, 2010    (JP) ................................. 2010-151841

(51) Int. Cl.
| | | |
|---|---|---|
| G03B 21/00 | (2006.01) |
| G03B 21/14 | (2006.01) |
| G02B 5/08 | (2006.01) |
| G02B 5/22 | (2006.01) |
| G02B 5/26 | (2006.01) |
| F21V 9/16 | (2006.01) |

(52) U.S. Cl.
USPC ................. 353/38; 353/84; 353/122; 362/84; 359/884; 359/885

(58) Field of Classification Search
USPC ............... 353/22, 24, 30–31, 38, 84, 94, 100, 353/102, 85, 97, 122; 359/722–723, 359/884–885, 887, 889–890, 892, 896; 362/2, 84, 293, 510; 352/41–42
See application file for complete search history.

(56) References Cited

U.S. PATENT DOCUMENTS

| | | | | |
|---|---|---|---|---|
| 8,038,299 B2* | 10/2011 | Inoue | ............................... | 353/31 |
| 8,167,440 B2* | 5/2012 | Sato et al. | ....................... | 353/99 |
| 2005/0157263 A1 | 7/2005 | Sakata et al. | | |
| 2009/0116107 A1* | 5/2009 | Kindler et al. | ................. | 359/457 |
| 2010/0085541 A1 | 4/2010 | Chen | | |
| 2010/0290008 A1 | 11/2010 | Suga et al. | | |
| 2011/0051102 A1* | 3/2011 | Ogura et al. | ..................... | 353/85 |
| 2011/0292349 A1* | 12/2011 | Kitano et al. | ................... | 353/31 |
| 2011/0304831 A1* | 12/2011 | Yoshigai | ......................... | 353/85 |
| 2012/0019786 A1* | 1/2012 | Kimura | ........................... | 353/31 |
| 2012/0127435 A1* | 5/2012 | Kitano et al. | ................... | 353/20 |
| 2013/0002972 A1* | 1/2013 | Tanaka | .............................. | 349/8 |

FOREIGN PATENT DOCUMENTS

| | | |
|---|---|---|
| CN | 1621891 A | 6/2005 |
| JP | A-2004-341105 | 12/2004 |
| JP | A-2009-199046 | 9/2009 |

\* cited by examiner

*Primary Examiner* — Tony Ko
*Assistant Examiner* — Jori S Reilly-Diakun
(74) *Attorney, Agent, or Firm* — Oliff & Berridge, PLC (57) ABSTRACT

A projector includes: an illumination device including plural solid-state light sources, plural collimator lenses that are provided to correspond to the plural solid-state light sources and substantially parallelize lights generated in the plural solid-state light sources, respectively, a focusing system that focuses the lights from the collimator lenses on a predetermined focusing position, and a diverging light generation part that is located near the focusing position and generates diverging light in an incident region where the light from the focusing system enters; a light modulation device that modulates the light from the illumination device in response to image information in a light modulation region; and a projection system that projects the light from the light modulation device, wherein an area of the incident region in the diverging light generation part is equal to or less than 1/102th of an area of the light modulation region in the light modulation device.

14 Claims, 8 Drawing Sheets

PROJECTOR

BACKGROUND

1. Technical Field

The present invention relates to a projector.

2. Related Art

In related art, a projector including an illumination device having a solid-state light source, a light modulation device that modulates light from the illumination device in response to image information, and a projection system that projects the light from the light modulation device has been known (for example, see Patent Document 1 (JP-A-2009-199046)).

According to the projector in related art, a projector with low power consumption may be provided because the projector includes an illumination device having a solid-state light source with low power consumption as the illumination device.

In a technological field of the projector, a projector with the higher brightness is constantly requested. Accordingly, it is conceivable that a projector with the higher brightness than that in the projector in related art is obtained by replacing the illumination device in the projector in related art by an illumination device having plural solid-state light sources.

However, by simply replacing the illumination device by an illumination device having plural solid-state light sources, the projector with the higher brightness than that in the projector in related art may be obtained, but there is a problem that the light use efficiency becomes lower because a total area of a light emission part in the illumination device is larger.

SUMMARY

An advantage of some aspects of the invention is to provide a projector with the higher brightness than that of the projector in related art and the reduced problem of degradation of the light use efficiency.

[1] A projector according to an aspect of the invention includes an illumination device including plural solid-state light sources, plural collimator lenses that are provided to correspond to the plural solid-state light sources and substantially parallelize lights generated in the plural solid-state light sources, respectively, a focusing system that focuses the lights from the collimator lenses on a predetermined focusing position, and a diverging light generation part that is located near the focusing position and generates diverging light in an incident region where the light from the focusing system enters, a light modulation device that modulates the light from the illumination device in response to image information in a light modulation region, and a projection system that projects light from the light modulation device, wherein an area of the incident region in the diverging light generation part is equal to or less than 1/102th of an area of the light modulation region in the light modulation device.

Therefore, according to the projector of the aspect of the invention, since the illumination device having the plural solid-state light sources is provided as the illumination device, the projector with the higher brightness than that in the projector in related art may be obtained.

Further, according to the projector of the aspect of the invention, since the lights from the plural solid-state light sources can be focused on the incident region in the diverging light generation part by the focusing system and the area of the incident region in the diverging light generation part is made equal to or less than 1/102th of the area of the light modulation region in the light modulation device, the problem of degradation of the light use efficiency may be reduced.

In this case, as is known from the test examples, which will be described later, if a liquid crystal light modulation device that has a tendency that the light use efficiency becomes lower as a total area of the light emitting part becomes larger is used, by making the area of the incident region in the diverging light generation part equal to or less than 1/102th of the area of the light modulation region in the light modulation device, the problem of degradation of the light use efficiency may be reduced. That is, as is known from Table 1 and Table 2, which will be described later, by making the area of the incident region in the diverging light generation part equal to or less than 1/102th of the area of the light modulation region in the light modulation device, the light use efficiency equal to or more than 99% with reference to the case where the area of the incident region is infinitesimal may be secured.

As a result, the projector of the aspect of the invention becomes a projector with the higher brightness than that of the projector in related art and the reduced problem of degradation of the light use efficiency.

"Diverging light" refers to light with low directionality. In the projector of the aspect of the invention, diverging light having a Lambertian distribution may be preferably used.

[2] According to the projector of the aspect of the invention, it is preferable that the area of the incident region in the diverging light generation part is equal to or more than 1/400th of the area of the light modulation region in the light modulation device.

In the projector of the aspect of the invention, as described above, since the area of the incident region in the diverging light generation part is equal to or less than 1/102th of the area of the light modulation region in the light modulation device, an advantage that the problem of degradation of the light use efficiency may be reduced is obtained, and, in addition, according to the configuration in the item [2], by making the area of the incident region in the diverging light generation part equal to or more than 1/400th of the area of the light modulation region in the light modulation device, an advantage that "excessive thermal load provided to the incident region is suppressed and deterioration and burnout of the diverging light generation part is suppressed, and thereby, the life of the diverging light generation part can be extended" may be obtained.

Note that, in the diverging light generation part, even if the area of the incident region in the diverging light generation part is made as small as possible, the incident light is diffused and spreads within the diverging light generation part, and thus, it is not necessary to make the area of the incident region in the diverging light generation part less than 1/400th of the area of the light modulation region in the light modulation device.

[3] According to the projector of the aspect of the invention, it is preferable that the solid-state light source includes a semiconductor laser.

Since the semiconductor laser is compact and has high output, a compact and high-output light source unit is obtained according to the above configuration.

Further, since the semiconductor laser outputs a laser beam having a good focusing property, the area of the incident region in the diverging light generation part may be easily made equal to or less than 1/102th of the area of the light modulation region in the light modulation device.

[4] In the projector of the aspect of the invention, it is preferable that the collimator lens includes an aspherical plano-convex lens having a hyperboloid incident surface and a flat exit surface.

According to the projector of the aspect of the invention, since the solid-state light source generally has an extremely small light emission area, the light from the solid-state light source can be substantially parallelized using the hyperboloid incident surface. Further, since the exit surface of the collimator lens is the flat surface, it is not necessary to accurately align the center axis of the incident surface and the center axis of the exit surface as in the case where both the incident surface and the exit surface are lens surfaces, and the parallelism of the light output from the collimator lens does not become lower due to inaccurate alignment of the center axis of the incident surface and the center axis of the exit surface. Therefore, the area of the incident region in the diverging light generation part can be easily made equal to or less than 1/102th of the area of the light modulation region in the light modulation device.

Further, since the exit surface that is easily contaminated is the flat surface, the contamination can be removed more easily.

[5] In the projector of the aspect of the invention, it is preferable that, given that a conic constant of the hyperboloid surface forming the incident surface of the collimator lens is $Ks_1$, the conic constant $Ks_1$ satisfies a condition of $-4<Ks_1<-2$.

According to the configuration, in the projector described in the item [4], the parallelism of the lights when the lights generated in the plural solid-state light sources are respectively and substantially parallelized can be improved and the area of the incident region in the diverging light generation part can be more easily made equal to or less than 1/102th of the area of the light modulation region in the light modulation device.

Note that, given that a refractive index for the light generated in the solid-state light source in the material forming the collimator lens is $n_1$, it is preferable that a condition of $Ks_1 \approx -n_1^2$ is satisfied, and more preferable that a condition of $Ks_1 = -n_1^2$ is satisfied. According to the configuration, the light from the solid-state light source can be parallelized on the incident surface of the collimator lens.

[6] In the projector of the aspect of the invention, it is preferable that the collimator lens includes an aspherical plano-convex lens having a flat incident surface and an ellipsoidal exit surface.

According to the projector of the aspect of the invention, since the solid-state light source generally has an extremely small light emission area, the light from the solid-state light source can be substantially parallelized using the ellipsoidal exit surface. Further, since the incident surface of the collimator lens is the flat surface, it is not necessary to accurately align the center axis of the incident surface and the center axis of the exit surface as in the case where both the incident surface and the exit surface are lens surfaces, and the parallelism of the light output from the collimator lens does not become lower due to inaccurate alignment of the center axis of the incident surface and the center axis of the exit surface.

Therefore, the area of the incident region in the diverging light generation part can be easily made equal to or less than 1/102th of the area of the light modulation region in the light modulation device.

[7] In the projector of the aspect of the invention, it is preferable that, given that a conic constant of the ellipsoidal surface forming the exit surface of the collimator lens is $Kd_1$, the conic constant $Kd_1$ satisfies a condition of $-1<Kd_1<-0.55$.

According to the configuration, in the projector described in the item [6], the parallelism of the lights when the lights generated in the plural solid-state light sources are respectively and substantially parallelized can be improved and the area of the incident region in the diverging light generation part can be more easily made equal to or less than 1/102th of the area of the light modulation region in the light modulation device.

[8] In the projector of the aspect of the invention, it is preferable that the focusing system includes an aspherical plano-convex lens having a flat incident surface and a hyperboloid exit surface.

According to the projector of the aspect of the invention, since the light from the collimator lens is nearly parallel light, the light from the collimator lens may be focused on an extremely small incident region using the hyperboloid exit surface. Further, since the incident surface of the focusing system is the flat surface, it is not necessary to accurately align the center axis of the incident surface and the center axis of the exit surface as in the case where both the incident surface and the exit surface are lens surfaces, and the focusing capability of the focusing system is not degraded due to inaccurate alignment of the center axis of the incident surface and the center axis of the exit surface. Therefore, the area of the incident region in the diverging light generation part can be easily made equal to or less than 1/102th of the area of the light modulation region in the light modulation device.

[9] In the projector of the aspect of the invention, it is preferable that, given that a conic constant of the hyperboloid surface forming the exit surface of the focusing system is $Ks_2$, the conic constant $Ks_2$ satisfies a condition of $-4<Ks_2<-2$.

According to the configuration, in the projector described in the item [8], the focusing property of lights when the lights from the collimator lens array are focused on the predetermined focusing position can be improved and the area of the incident region in the diverging light generation part can be even more easily made equal to or less than 1/102th of the area of the light modulation region in the light modulation device.

Note that, given that a refractive index for the light generated in the solid-state light source in the material forming the focusing system is $n_2$, it is preferable that a condition of $Ks_2 \approx -n_2^2$ is satisfied, and more preferable that a condition of $Ks_2 = -n_2^2$ is satisfied. According to the configuration, the nearly parallel light from the collimator lens can be focused on the predetermined focusing position with accuracy.

[10] In the projector of the aspect of the invention, it is preferable that the focusing system includes an aspherical plano-convex lens having an ellipsoidal incident surface and a flat exit surface.

According to the projector of the aspect of the invention, since the light from the collimator lens is nearly parallel light, the light from the collimator lens may be focused on an extremely small incident region using the ellipsoidal incident surface. Further, since the exit surface of the focusing system is the flat surface, it is not necessary to accurately align the center axis of the incident surface and the center axis of the exit surface as in the case where both the incident surface and the exit surface are lens surfaces, and the focusing capability of the focusing system is not degraded due to inaccurate alignment of the center axis of the incident surface and the center axis of the exit surface. Therefore, the area of the incident region in the diverging light generation part can be easily made equal to or less than 1/102th of the area of the light modulation region in the light modulation device.

[11] In the projector of the aspect of the invention, it is preferable that, given that a conic constant of the ellipsoidal surface forming the incident surface of the focusing system is $Kd_2$, the conic constant $Kd_2$ satisfies a condition of $-1<Kd_2<-0.55$.

According to the configuration, in the projector described in the item [10], the focusing property of lights when the lights from the collimator lens array are focused on the predetermined focusing position can be improved and the area of the incident region in the diverging light generation part can be even more easily made equal to or less than 1/102th of the area of the light modulation region in the light modulation device.

[12] In the projector of the aspect of the invention, it is preferable that the diverging light generation part has a phosphor layer that generates phosphor from a part or whole of the light from the focusing system.

According to the configuration, desired color lights can be obtained using the solid-state light sources that generate lights having a particular wavelength, and, using the illumination device, a projector with the higher brightness than that of the projector in related art and with the reduced problem of degradation of the light use efficiency can be formed.

Note that, since the phosphor generated in the phosphor layer has the Lambertian distribution as a whole, the phosphor is diverging light referred to in the aspect of the invention. Further, the light not involved in generation of phosphor of the light from the focusing system is scattered or reflected in the phosphor layer, and thus, becomes diverging light in the aspect of the invention.

[13] In the projector of the aspect of the invention, it is preferable that the diverging light generation part has a scattering layer that generates scattered light by scattering the light from the focusing system.

According to the configuration, the lights from the plural solid-state light sources can be focused on the incident region and diverging light can be generated in the single incident region. Using the illumination device, the projector with the higher brightness than that of the projector in related art and with the reduced problem of degradation of the light use efficiency may be formed.

[14] In the projector of the aspect of the invention, it is preferable that the diverging light generation part is rotatable around a predetermined rotation axis, and a position of the incident region in the diverging light generation part is moved in response to rotation of the diverging light generation part and along a rotation direction of the diverging light generation part.

According to the configuration, the lights from the focusing system are not focused on a particular incident region. As a result, no excessive thermal load is provided to the particular incident region, and thereby, deterioration and burnout of the diverging light generation part is suppressed and the life of the diverging light generation part can be further extended.

Note that, as described in the item [3], in the case where the solid-state light source including the semiconductor laser is used, speckle noise generated due to interferences of laser beams can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a projector of the invention will be explained according to embodiments shown in the drawings.

Embodiment 1

Figure 1:
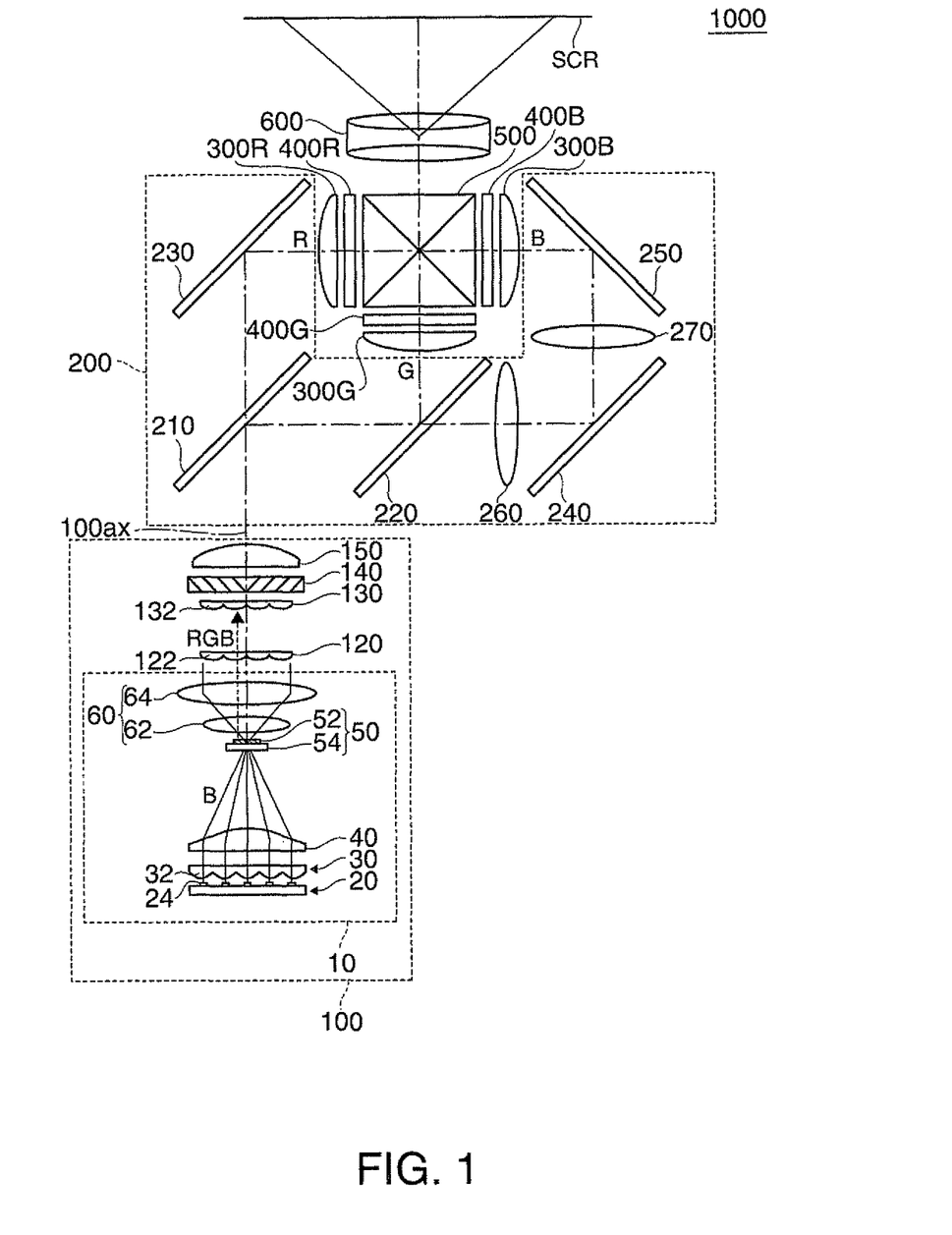
FIG. 1 is a plan view showing an optical system of a projector according to embodiment 1.

FIG. 1 is a plan view showing an optical system of a projector 1000 according to embodiment 1.

Figure 2A:
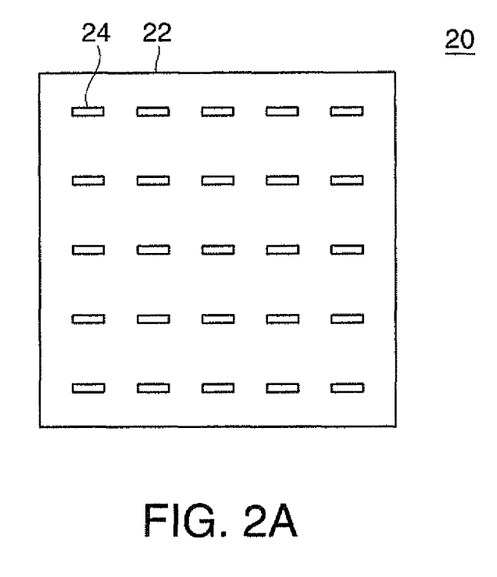
FIGS. 2A and 2B are diagrams for explanation of a solid-state light source array and a diverging light generation part in embodiment 1.
Figure 2B:
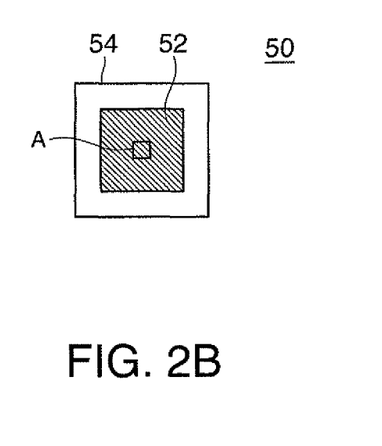

FIGS. 2A and 2B are diagrams for explanation of a solid-state light source array 20 and a diverging light generation part 50 in embodiment 1. FIG. 2A shows the solid-state light source array 20 seen from a collimator lens array 30 side, and FIG. 2B shows the diverging light generation part 50 seen from a collimator system 60 side.

Figure 3A:
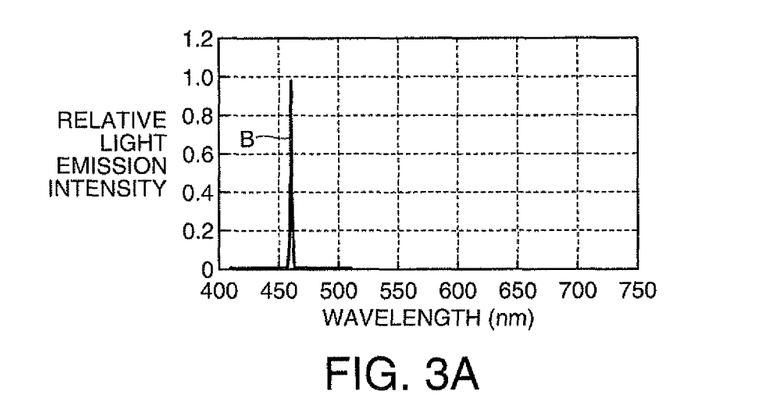
FIGS. 3A and 3B are graphs showing light emission intensity characteristics of a solid-state light source and light emission intensity characteristics of a phosphor material.
Figure 3B:
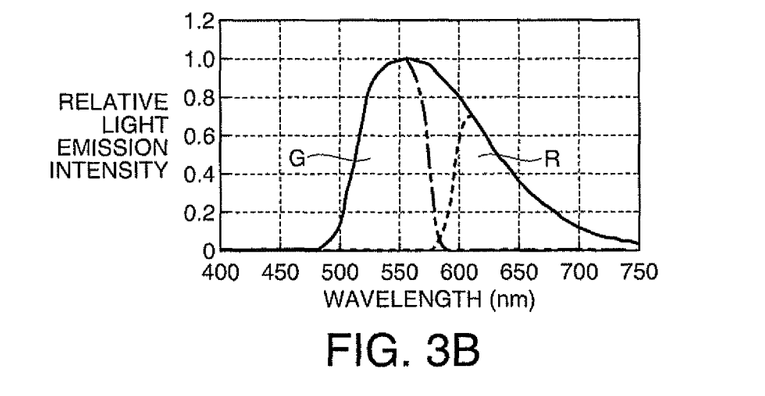

FIGS. 3A and 3B are graphs showing light emission intensity characteristics of a solid-state light source 24 and light emission intensity characteristics of a phosphor material. FIG. 3A is a graph showing light emission intensity characteristics of the solid-state light source 24, and FIG. 3B is a graph showing light emission intensity characteristics of a phosphor material contained in a phosphor layer 52. The light emission intensity characteristics refer to characteristics of a wavelength and intensity of light output when a voltage is applied in the case of a light source and when light (excited light) that can generate phosphor enters in the case of a phosphor material. The vertical axis of the graph indicates relative light emission intensity with light emission intensity at a wavelength at which the light emission intensity is the strongest as "1". The horizontal axis of the graph indicates a wavelength.

Note that, in the respective drawings, the sign R shows red light, the sign G shows green light, and the sign B shows blue light.

In the specifications and the drawings, description and illustration of component elements not directly related to the optical system (a casing, fixing parts for fixing component elements, etc.) are omitted.

As shown in FIG. 1, the projector 1000 according to embodiment 1 includes an illumination device 100, a color separation and guiding system 200, three liquid crystal light modulation devices 400R, 400G, 400S as light modulation devices, a cross dichroic prism 500, and a projection system 600.

The illumination device 100 includes a light source unit 10, a first lens array 120, a second lens array 130, a polarization conversion element 140, and a superimposing lens 150. The illumination device 100 outputs white light containing red light, green light, and blue light.

The light source unit 10 includes the solid-state light source array 20, the collimator lens array 30, a focusing system 40, the diverging light generation part 50, and the collimator system 60. The light source unit 10 outputs white light as a whole.

As shown in FIGS. 1 and 2A, the solid-state light source array 20 has a substrate 22 and 25 solid-state light sources 24 that generate blue light. In the solid-state light source array 20, the 25 solid-state light sources 24 are arranged in a matrix of five rows and five columns. In FIG. 2A, only the uppermost left solid-state light source 24 is shown by the sign.

Note that, in the projector of the embodiment of the invention, the number of solid-state light sources is not limited to "25" but may be a plural number, i.e., two or more.

The substrate 22 has a function of mounting the solid-state light sources 24 thereon. Though the detailed explanation will be omitted, the substrate 22 has a function of mediating power supply to the solid-state light sources 24, a function of releasing heat generated in the solid-state light sources 24, etc. together.

The solid-state light source 24 includes a semiconductor laser that generates blue light (peak of light emission intensity: about 460 nm, see FIG. 3A) as excited light. As shown in FIG. 2A, the semiconductor laser has a light emission region having a rectangular shape, and is formed so that a spread angle along a short side direction of the light emission region may be larger than a spread angle along along side direction of the light emission region. The size of the light emission region in the semiconductor laser is, for example, 8 μm on the long side and 2 μm on the short side.

As shown in FIG. 1, the collimator lens array 30 is provided to correspond to the 25 solid-state light sources 24 and has plural collimator lenses 32 (only one at the end is shown by the sign) that substantially parallelize respective lights generated by the 25 solid-state light sources 24. Though their explanation by illustration is omitted, the plural collimator lenses 32 are arranged in a matrix of five rows and five columns.

Though its detailed explanation by illustration is omitted, the collimator lens 32 includes an aspherical plano-convex lens having a hyperboloid incident surface and a flat exit surface. The collimator lens 32 is formed so that, given that a conic constant of the hyperboloid surface forming the incident surface of the collimator lens 32 is $Ks_1$, $Ks_1=-2.3$ and a condition of $-4<Ks_1<-2$ is satisfied. Further, given that a refractive index for the light generated in the solid-state light source 24 (blue light having a wavelength of about 460 nm) is $n_1$, the collimator lens 32 is made of optical glass with $n_1=1.52$, and $n_1^2=2.3104$ and a condition of $Ks_1\approx-n_1^2$ is satisfied.

The focusing system 40 focuses the lights from the collimator lens array 30 on a predetermined focusing position. Though its detailed explanation by illustration is omitted, the focusing system 40 includes an aspherical plano-convex lens having a flat incident surface and a hyperboloid exit surface. The focusing system 40 is formed so that, given that a conic constant of the hyperboloid surface forming the exit surface of the focusing system 40 is $Ks_2$, $Ks_2=-2.3$ and a condition of $-4<Ks_2<-2$ is satisfied. Further, given that a refractive index for the light generated in the solid-state light source 24 (blue light having a wavelength of about 460 nm) is $n_2$, the focusing system 40 is made of optical glass with $n_2=1.52$, and $n_2^2=2.3104$ and a condition of $Ks_2\approx-n_2^2$ is satisfied.

Note that, in the projector 1000 according to embodiment 1, the collimator lens array 30 and the focusing system 40 are provided at a distance, however, both the exit surface of the collimator lens array 30 and the incident surface of the focusing system 40 are flat, and, for example, the collimator lens array 30 and the focusing system 40 may be provided in contact with each other on the surfaces and used as an integrated member.

The diverging light generation part 50 is located near the focusing position, and generates diverging light in an incident region into which the light from the focusing system 40 enters. The diverging light generation part 50 has the phosphor layer 52 that generates phosphor containing red light and green light from part of the blue light from the focusing system 40 and a transparent member 54 that supports the phosphor layer 52. The diverging light generation part 50 outputs diverging light containing blue light not involved in generation of phosphor, but passing through the phosphor layer 52 together with phosphor. The diverging light is white light as a whole. As shown in FIG. 28, the diverging light generation part 50 has a square plate-like shape as a whole and is fixed to a predetermined position (see FIG. 1).

The phosphor layer 52 includes a layer containing $(Y,Gd)_3(Al,Ga)_5O_{12}$:Ce as a YAG phosphor material. Note that the phosphor layer may include a layer containing a YAG phosphor material other than $(Y,Gd)_3(Al,Ga)_5O_{12}$:Ce, or a layer containing silicate phosphor material, or a layer containing a TAG phosphor material. Or, the phosphor layer may include a layer containing a mixture of a phosphor material that converts primary excited light into red light (e.g., $CaAlSiN_3$ red phosphor material) and a phosphor material that converts primary excited light into green light (e.g., β-sialon green phosphor material).

The phosphor layer 52 converts part of the blue light from the focusing system 40 into phosphor containing red light (peak of light emission intensity: about 610 nm) and green light (peak of light emission intensity: about 550 nm) and outputs it (see FIG. 3B).

Note that, of the blue light, part of the blue light not involved in generation of phosphor, but passing through the phosphor layer 52 is output together with the phosphor. In this regard, the blue light is scattered or reflected in the phosphor layer 52, and output from the phosphor layer 52 as diverging light having nearly the same distribution (so-called Lambertian distribution) characteristic as that of the phosphor.

The transparent member 54 includes quartz glass or optical glass, for example.

At the focusing system 40 side of the phosphor layer 52, a layer that allows the blue light from the focusing system 40 to pass and reflects the phosphor (so-called dichroic coating) may be formed.

The incident region in the diverging light generation part 50 is on the phosphor layer 52, the incident region has a square shape with one side of 0.8 mm, and the area of the incident region is 0.64 mm². In FIG. 2B, the incident region is shown by sign A. This is the same in FIG. 5, which will be described later.

Though the detailed explanation by illustration will be omitted, the projector 1000 according to embodiment 1 is adapted so that the light from the focusing system 40 enters over the entire of the incident region A in a defocus state.

The collimator system 60 substantially parallelizes the diverging light from the diverging light generation part 50. As shown in FIG. 1, the collimator system 60 includes a first lens 62 and a second lens 64. The first lens 62 and the second lens 64 include biconvex lenses. Note that the shapes of the first lens and the second lens are not limited to the above shapes, but, in short, may be shapes such that the collimator system including the first lens and the second lens may substantially parallelizes light from the diverging light generation part. Further, the number of lenses forming the collimator system may be one or three or more.

As shown in FIG. 1, the first lens array 120 has plural first small lenses 122 for dividing light from the light source unit 10 into plural partial luminous fluxes. The first lens array 120 has a function as a luminous flux dividing optical element that divides light from the light source unit 10 into plural partial luminous fluxes and has a configuration in which the plural first small lenses 122 are arranged in a matrix of plural rows and plural columns within a surface orthogonal to an illumination optical axis 100ax. Though the explanation by illustration will be omitted, the outer shape of the first small lens 122 is a nearly similar shape to the outer shape of an image formation region as a light modulation region in the liquid crystal light modulation device 400R, 400G, 400B (as will be described later, the shape of lateral:longitudinal=16:10).

The second lens array 130 has plural second small lenses 132 corresponding to the plural first small lenses 122 of the first lens array 120. The second lens array 130 has a function of focusing images of the respective first small lenses 122 of the first lens array 120 near the image formation regions of the liquid crystal light modulation devices 400R, 400G, 400B with the superimposing lens 150. The second lens array 130 has a configuration in which the second small lenses 132 are arranged in a matrix of plural rows and plural columns within the surface orthogonal to the illumination optical axis 100ax.

The polarization conversion element 140 is a polarization conversion element that outputs the respective partial luminous fluxes divided by the first lens array 120 as nearly one kind of linearly-polarized light in an aligned polarization direction.

The polarization conversion element 140 has a polarized light separation layer that transmits one linearly-polarized component of the polarized components contained in the light from the light source unit 10 and reflects the other linearly-polarized component in a direction perpendicular to the illumination optical axis 100ax, a reflection layer that reflects the other linearly-polarized component reflected by the polarized light separation layer in a direction in parallel to the illumination optical axis 100ax, and a retardation film that converts the other linearly-polarized component reflected by the reflection layer into the one linearly-polarized component.

The superimposing lens 150 superimposes the respective partial luminous fluxes from the polarization conversion element 140 in an illuminated region. The superimposing lens 150 is an optical element that collects the partial luminous fluxes and superimposes them near the image formation regions of the liquid crystal light modulation devices 400R, 400G, 400B. The superimposing lens 150 is provided so that the optical axis of the superimposing lens 150 and the optical axis of the illumination device 100 are nearly aligned. Note that the superimposing lens 150 may be formed by a compound lens combining plural lenses. The first lens array 120, the second lens array 130, and the superimposing lens 150 form an integrator system that makes the light from the light source unit 10 more uniform as a lens integrator system.

Note that, in place of the lens integrator system, a rod integrator system including an integrator rod may be used.

The color separation and guiding system 200 includes dichroic mirrors 210, 220, reflection mirrors 230, 240, 250, and relay lenses 260, 270. The color separation and guiding system 200 has a function of separating the light from the illumination device 100 into red light, green light, and blue light and guiding the respective color lights to the liquid crystal light modulation devices 400R, 400G, 400B to be illuminated.

Collecting lenses 300R, 300G, 300B are provided between the color separation and guiding system 200 and the liquid crystal light modulation devices 400R, 400G, 400B.

The dichroic mirrors 210, 220 are mirrors with wavelength-selective transmission films that reflect lights in predetermined wavelength regions and transmit lights in other wavelength regions formed on substrates.

The dichroic mirror 210 is a dichroic mirror that reflects a green light component and a blue light component and transmits a red light component.

The dichroic mirror 220 is a dichroic mirror that reflects a green light component and transmits a blue light component.

The reflection mirror 230 is a reflection mirror that reflects a red light component.

The reflection mirrors 240, 250 are reflection mirrors that reflect a blue light component.

The red light passing through the dichroic mirror 210 is reflected by the reflection mirror 230, passes through the collecting lens 300R, and enters the image formation region of the liquid crystal light modulation device 400R for red light.

The green light reflected by the dichroic mirror 210 is further reflected by the reflection mirror 220, passes through the collecting lens 300G, and enters the image formation region of the liquid crystal light modulation device 400G for green light.

The blue light passing through the dichroic mirror 220 passes through the relay lens 260, the reflection mirror 240 at the incident side, the relay lens 270, the reflection mirror 250 at the exit side, and the collecting lens 300B, and enters the image formation region of the liquid crystal light modulation device 400B for blue light. The relay lenses 260, 270 and the reflection mirrors 240, 250 have a function of guiding the blue light component transmitted through the dichroic mirror 220 to the liquid crystal light modulation device 400B.

Note that the relay lenses 260, 270 are provided in the optical path of the blue light for preventing degradation of the use efficiency of light due to diffusion of light because the optical path length of the blue light is longer than the optical path lengths of the other color lights. In the projector 1000 according to embodiment 1, the above described configuration is employed because the optical path length of the blue light is longer, however, a configuration in which the optical path length of the red light is made longer and the relay lenses 260, 270 and the reflection mirrors 240, 250 are used for the optical path of the red light may be employed.

The liquid crystal light modulation devices 400R, 400G, 400B modulate entering color lights in response to image information and form color images, and are illuminated by the illumination device 100. Note that, though not shown, light incident-side polarizers are provided between the respective collecting lenses 300R, 300G, 300B and the respective liquid crystal light modulation devices 400R, 400G, 400B, respectively, and light exiting-side polarizers are provided between the respective liquid crystal light modulation devices 400R, 400G, 400B and the cross dichroic prism 500, respectively. The light modulation of the entering respective color lights is performed by these light incident-side polarizers, liquid crystal light modulation devices 400R, 400G, 400B, and the light exiting-side polarizers.

The liquid crystal light modulation devices 400R, 400G, 400B are transmissive liquid crystal light modulation devices having light modulation regions in which liquid crystal as an electrooptic material is closely sealed between a pair of transparent glass substrates, and modulate the polarization direction of one kind of linearly polarized light output from the light incident-side polarizers in response to provided image signals using polysilicon TFTs as switching elements, for example.

In the projector 1000 according to embodiment 1, each of the liquid crystal light modulation devices 400R, 400G, 400B has the light modulation region, 12.8 mm wide by 8 mm long (0.59-inch 16:10 panel), and the area of the light modulation region is 102.4 mm$^2$.

As described above, the area of the incident region in the diverging light generation part 50 is 0.64 mm$^2$, and, in the projector 1000, the area of the incident region in the diverging light generation part 50 is equal to or less than 1/102th (about 1 mm$^2$) and more than 1/400th (0.256 mm$^2$) of the area of the light modulation region in the liquid crystal light modulation device 400R, 400G, 400B.

Note that, in the projector of the embodiment of the invention, the shape and the area of the incident region in the diverging light generation part are not limited to those described above. Further, the shape and the area of the light modulation region in the light modulation device are not limited to those described above. In short, the area of the incident region in the diverging light generation part may be equal to or less than 1/102th of the area of the light modulation region in the light modulation device.

The cross dichroic prism 500 is an optical element that combines optical images modulated with respect to each color light output from the light exiting-side polarizers and forms a color image. The cross dichroic prism 500 has a nearly square shape in plan view formed by bonding four right angle prisms, and dielectric multilayer films are formed on nearly X-shaped interfaces on which the right angle prisms are bonded. The dielectric multilayer film formed on one of the nearly X-shaped interfaces reflects red light and the dielectric multilayer film formed on the other interface reflects blue light. The red light and the blue light are bent by the dielectric multilayer films and aligned in the traveling direction of the green light, and the three color lights are combined.

The color image output from the cross dichroic prism 500 is enlarged and projected by the projection system 600 and forms an image on a screen SCR.

Next, advantages of the projector 1000 according to embodiment 1 will be explained.

According to the projector 1000 of embodiment 1, the illumination device 100 having the plural solid-state light sources 24 is provided as the illumination device, and thus, a projector with the higher brightness than that of the projector in related art may be provided.

Further, according to the projector 1000 of embodiment 1, the lights (blue lights) from the plural solid-state light sources 24 are focused by the focusing system 40 into the incident region in the diverging light generation part 50 and the area of the incident region in the diverging light generation part 50 is made equal to or less than 1/102th of the area of the light modulation region in the liquid crystal light modulation device 400R, 400G, 400B, and thus, a problem of degradation of the light use efficiency may be reduced.

With the above described advantages, the projector 1000 according to embodiment 1 becomes a projector with the higher brightness than that of the projector in related art and with the reduced problem of degradation of the light use efficiency.

Further, according to the projector 1000 of embodiment 1, the area of the incident region in the diverging light generation part 50 is equal to or more than 1/400th of the area of the light modulation region in the liquid crystal light modulation device 400R, 400G, 400B, and thus, an advantage that "excessive thermal load provided to the incident region is suppressed and deterioration and burnout of the diverging light generation part 50 is suppressed, and thereby, the life of the diverging light generation part 50 can be extended" may be obtained.

Furthermore, according to the projector 1000 of embodiment 1, the solid-state light source 24 includes a semiconductor laser, and thus, a compact and high-output light source unit is obtained. In addition, since the semiconductor laser unit outputs a laser beam with a high focusing property, the area of the incident region in the diverging light generation part 50 is easily made equal to or less than 1/102th of the area of the light modulation region in the liquid crystal light modulation device 400R, 400G, 400B.

Further, according to the projector 1000 of embodiment 1, the collimator lens 32 includes the aspherical plano-convex lens having the hyperboloid incident surface, and thus, the light from the solid-state light source 24 may be substantially parallelized using the hyperboloid incident surface. Furthermore, since the exit surface of the collimator lens 32 is a flat surface, it is not necessary to accurately align the center axis of the incident surface and the center axis of the exit surface as in the case where both the incident surface and the exit surface are lens surfaces, and the parallelism of the light output from the collimator lens does not become lower due to inaccurate alignment of the center axis of the incident surface and the center axis of the exit surface. Therefore, the area of the incident region in the diverging light generation part 50 is easily made equal to or less than 1/102th of the area of the light modulation region in the liquid crystal light modulation device 400R, 400G, 400B. In addition, since the exit surface that is easily contaminated is the flat surface, the contamination can be removed more easily.

Further, according to the projector 1000 of embodiment 1, since the conic constant $Ks_1$ of the hyperboloid surface forming the incident surface of the collimator lens 32 is −2.3, the parallelism of the lights when the lights generated in the plural solid-state light sources 24 are respectively and substantially parallelized can be improved and the area of the incident region in the diverging light generation part 50 is more easily made equal to or less than 1/102th of the area of the light modulation region in the liquid crystal light modulation device 400R, 400G, 400B.

Furthermore, according to the projector 1000 of embodiment 1, since the condition of $Ks_1 \approx -n_1^2$ is satisfied in the collimator lens 32, the light from the solid-state light source 24 can be parallelized on the incident surface of the collimator lens 32.

In addition, according to the projector 1000 of embodiment 1, since the focusing system 40 includes the aspherical plano-convex lens having the hyperboloid exit surface, and the light from the collimator lens 32 may be focused on an extremely small incident region using the hyperboloid exit surface. Further, since the incident surface of the focusing system 40 is the flat surface, it is not necessary to accurately align the center axis of the incident surface and the center axis of the exit surface as in the case where both the incident surface and the exit surface are lens surfaces, and the focusing capability of the focusing system 40 is not degraded due to inaccurate alignment of the center axis of the incident surface and the center axis of the exit surface. Therefore, the area of the incident region in the diverging light generation part 50 is easily made equal to or less than 1/102th of the area of the light modulation region in the liquid crystal light modulation device 400R, 400G, 400B.

Furthermore, according to the projector 1000 of embodiment 1, since the conic constant $Ks_2$ of the hyperboloid surface forming the exit surface in the focusing system 40 is −2.3, the focusing property of lights when the lights from the collimator lens array 30 are focused on a predetermined focusing position can be improved and the area of the incident region in the diverging light generation part 50 is even more easily made equal to or less than 1/102th of the area of the light modulation region in the liquid crystal light modulation device 400R, 400G, 400B.

Furthermore, according to the projector 1000 of embodiment 1, since the condition of $Ks_2 \approx -n_2^2$ is satisfied in the focusing system 40, the nearly parallel light from the collimator lens 32 can be focused on the predetermined focusing position with high accuracy.

In addition, according to the projector 1000 of embodiment 1, since the diverging light generation part 50 has the phosphor layer 52 that generates phosphor (red light and green light) from the part of the light from the focusing system 40, desired color lights can be obtained using the solid-state light sources 24 that generate lights having a particular wavelength, and, using the illumination device 100, a projector with the higher brightness than that of the projector in related art and with the reduced problem of degradation of the light use efficiency can be formed.

Test Example 1 and Test Example 2

Here, using test example 1 and test example 2, the advantages of the projector of the invention will be explained.

In test example 1 and test example 2, simulations as to how the brightness of the projector changes when the area of the incident region is changed were performed. The configuration of the projector according to test example 1 and test example 2 is basically the same as the projector 1000 of embodiment 1, and the simulations were performed on a condition that the first lens array and the second lens array have 56 first smaller lenses and second small lenses, respectively, the pitch of the polarization conversion elements is 2.2 mm, and the F-value of the projection lens is 1.5.

Table 1 shows results of test example 1. In Table 1, "Condition" indicates numbers assigned to the respective conditions, "Incident region size" indicates lengths of one side of the square incident region, "Incident region area" literally indicates areas of the incident region, "Area ratio" indicates "incident region area/light modulation region area" with numerators as "1" in numeric values, and "Relative brightness" indicates brightness with reference to the case where the area of the incident region is infinitesimal. These are the same in Table 2, which will be described later.

In test example 1, simulations using a liquid crystal light modulation device having a light modulation region, 12.8 mm wide by 8 mm long (0.59-inch 16:10 panel, the area of the light modulation region is 102.4 mm²) were performed.

TABLE 1

RESULTS OF TEST EXAMPLE 1

| Condition | Incident Region size | Incident region area | Area ratio | Relative brightness |
|---|---|---|---|---|
| 1 | 0.75 mm | 0.5625 mm² | 1/182 | 100.00% |
| 2 | 0.80 mm | 0.6400 mm² | 1/160 | 99.97% |
| 3 | 0.85 mm | 0.7225 mm² | 1/142 | 99.95% |
| 4 | 0.90 mm | 0.8100 mm² | 1/126 | 99.90% |
| 5 | 0.95 mm | 0.9025 mm² | 1/114 | 99.75% |
| 6 | 1.00 mm | 1.0000 mm² | 1/102 | 99.44% |
| 7 | 1.05 mm | 1.1025 mm² | 1/93 | 98.73% |
| 8 | 1.10 mm | 1.2100 mm² | 1/85 | 97.70% |
| 9 | 1.15 mm | 1.3225 mm² | 1/77 | 96.23% |
| 10 | 1.20 mm | 1.4400 mm² | 1/71 | 93.74% |
| 11 | 1.25 mm | 1.5625 mm² | 1/66 | 89.68% |

TABLE 1-continued

RESULTS OF TEST EXAMPLE 1

| Condition | Incident Region size | Incident region area | Area ratio | Relative brightness |
|---|---|---|---|---|
| 12 | 1.30 mm | 1.6900 mm² | 1/61 | 84.72% |
| 13 | 1.35 mm | 1.8225 mm² | 1/56 | 79.62% |
| 14 | 1.40 mm | 1.9600 mm² | 1/52 | 74.79% |

As shown in Table 1, it is known that, if the area ratio is equal to or less than 1/102, relative brightness equal to or more than 99% may be secured, and the degradation of the light use efficiency can be reduced.

In test example 2, simulations using a liquid crystal light modulation device having a light modulation region, 16 mm wide by 10 mm long (0.74-inch 16:10 panel, the area of the light modulation region is 160 mm²) were performed.

TABLE 2

RESULTS OF TEST EXAMPLE 2

| Condition | Incident Region size | Incident region area | Area ratio | Relative brightness |
|---|---|---|---|---|
| 1 | 1.00 mm | 1.0000 mm² | 1/160 | 100.00% |
| 2 | 1.05 mm | 1.1025 mm² | 1/145 | 99.95% |
| 3 | 1.10 mm | 1.2100 mm² | 1/132 | 99.92% |
| 4 | 1.15 mm | 1.3225 mm² | 1/121 | 99.84% |
| 5 | 1.20 mm | 1.4400 mm² | 1/111 | 99.72% |
| 6 | 1.25 mm | 1.5625 mm² | 1/102 | 99.46% |
| 7 | 1.30 mm | 1.6900 mm² | 1/95 | 98.94% |
| 8 | 1.35 mm | 1.8225 mm² | 1/88 | 98.23% |
| 9 | 1.40 mm | 1.9600 mm² | 1/82 | 97.29% |
| 10 | 1.45 mm | 2.1025 mm² | 1/76 | 95.97% |
| 11 | 1.50 mm | 2.2500 mm² | 1/71 | 93.98% |
| 12 | 1.55 mm | 2.4025 mm² | 1/67 | 90.93% |
| 13 | 1.60 mm | 2.5600 mm² | 1/63 | 87.20% |
| 14 | 1.65 mm | 2.7225 mm² | 1/59 | 83.11% |

As shown in Table 2, it is also known that, if the area ratio is equal to or less than 1/102, relative brightness equal to or more than 99% may be secured, and the degradation of the light use efficiency can be reduced.

Embodiment 2

Figure 4:
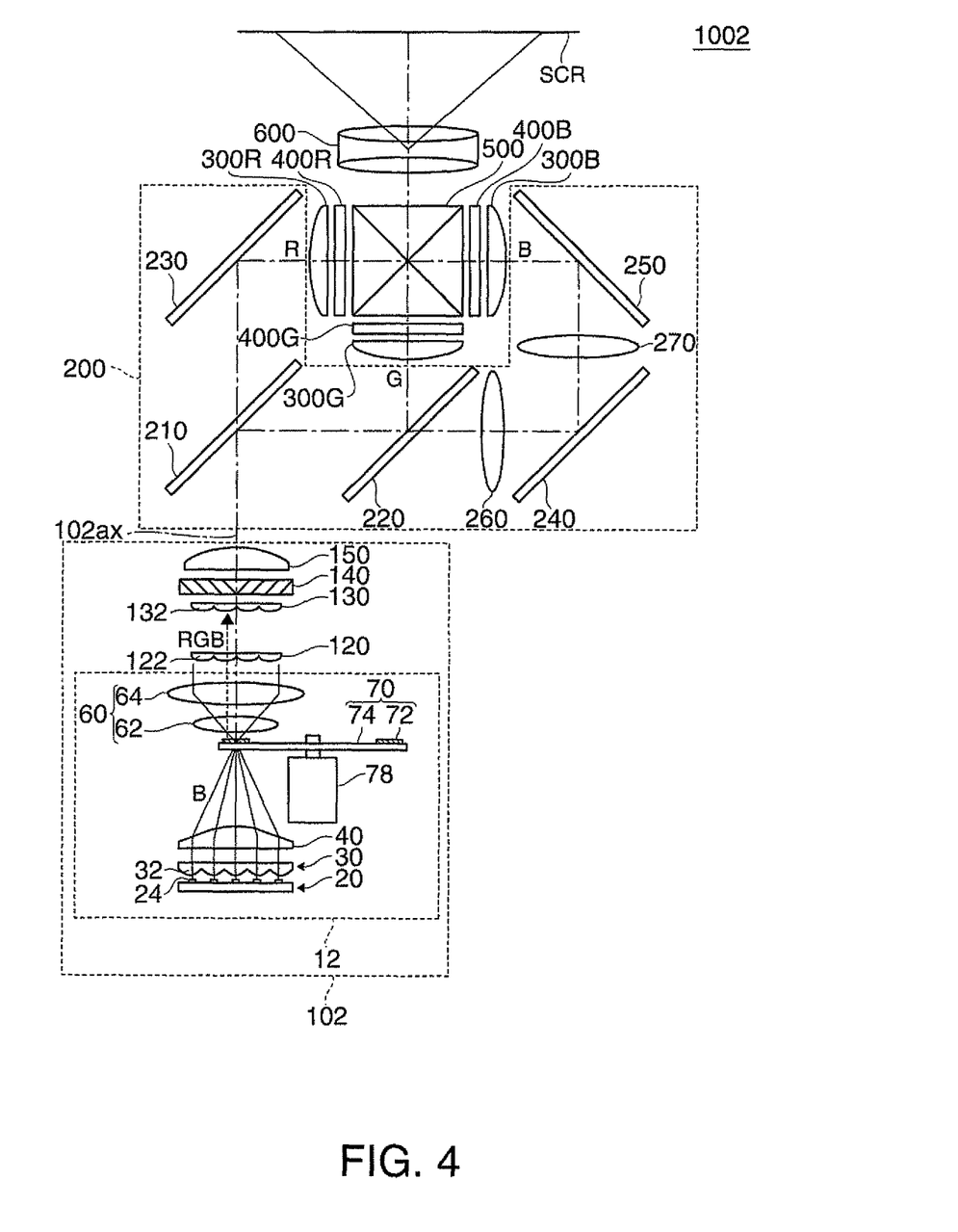
FIG. 4 is a plan view showing an optical system of a projector according to embodiment 2.

FIG. 4 is a plan view showing an optical system of a projector 1002 according to embodiment 2.

Figure 5:
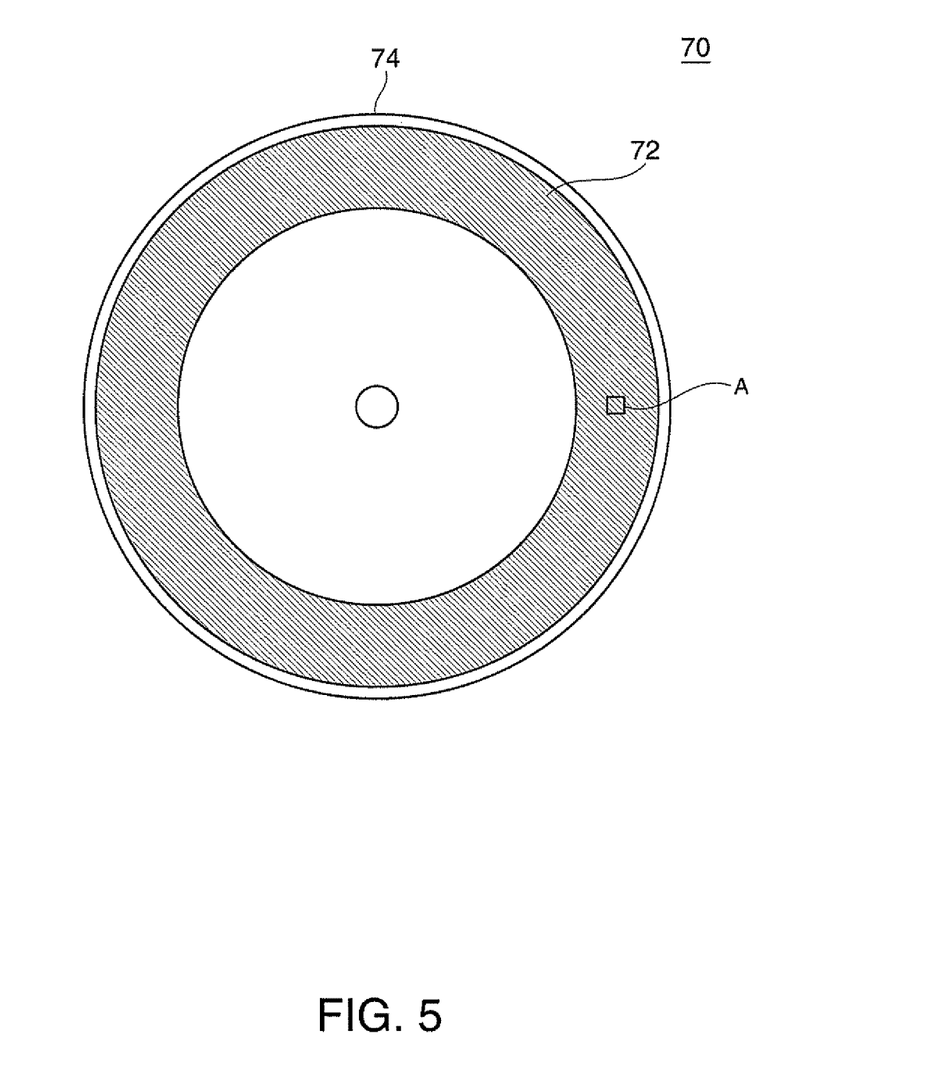
FIG. 5 shows a diverging light generation part in embodiment 2 seen from a collimator system side.

FIG. 5 shows a diverging light generation part 70 in embodiment 2 seen from a collimator system 60 side.

The projector 1002 according to embodiment 2 basically has the same configuration as that of the projector 1000 according to embodiment 1, however, different from the projector 1000 according to embodiment 1 in the configuration of the diverging light generation part. That is, in the projector 1002 according to embodiment 2, as shown in FIGS. 4 and 5, the diverging light generation part 70 is adapted to be rotatable around a predetermined rotational axis so that the position of the incident region in the diverging light generation part 70 may move in response to the rotation of the diverging light generation part 70 along the rotation direction of the diverging light generation part 70.

The diverging light generation part 70 has a phosphor layer 72 that generates phosphor containing red light and green light from part of the blue light from the focusing system 40 and a transparent member 74 that supports the phosphor layer 72. The diverging light generation part 70 is adapted to be rotatable by a drive force from a rotational driving unit 78. The rotational driving unit 78 is a motor, for example.

As shown in FIG. 5, the phosphor layer 72 is formed in an annual shape corresponding to the position of the incident region moving in response to the rotation of the diverging light generation part 70. The phosphor layer 72 has the same configuration as that of the phosphor layer 52 in embodiment 1 except its shape.

The transparent member 74 includes a transparent circular rotating plate. The transparent member 74 has the same configuration as that of the transparent member 54 in embodiment 1 except its shape.

As described above, the projector 1002 according to embodiment 2 is different from the projector 1000 according to embodiment 1 in the configuration of the diverging light generation part, however, like the projector 1000 according to embodiment 1, includes an illumination device 102 having plural solid-state light sources 24 as an illumination device and allows the lights from the plural solid-state light sources 24 to focus on the incident region in the diverging light generation part 70 by the focusing system 40 and makes the area of the incident region in the diverging light generation part 70 equal to or less than 1/102th of the area of the light modulation region in the light modulation device. Thus, the projector with the higher brightness than that of the projector in related art and with the reduced problem of degradation of the light use efficiency is obtained.

Further, according to the projector 1002 of embodiment 2, the diverging light generation part 70 is adapted to be rotatable around the predetermined rotational axis so that the position of the incident region in the diverging light generation part 70 may move in response to the rotation of the diverging light generation part 70 along the rotation direction of the diverging light generation part 70, and thus, the lights from the focusing system 40 are not focused on a particular incident region. As a result, no excessive thermal load is provided to the particular incident region, and thereby, deterioration and burnout of the diverging light generation part 70 is suppressed and the life of the diverging light generation part 70 can be further extended.

Furthermore, according to the projector 1002 of embodiment 2, speckle noise generated due to interferences of laser beams can be reduced.

Note that, since the projector 1002 according to embodiment 2 has the same configuration as that of the projector 1000 according to embodiment 1 except the difference in the configuration of the excited light generation part from the projector 1000 according to embodiment 1, the projector has corresponding advantages of the advantages of the projector 1000 according to embodiment 1 as they are.

Embodiment 3

Figure 6:
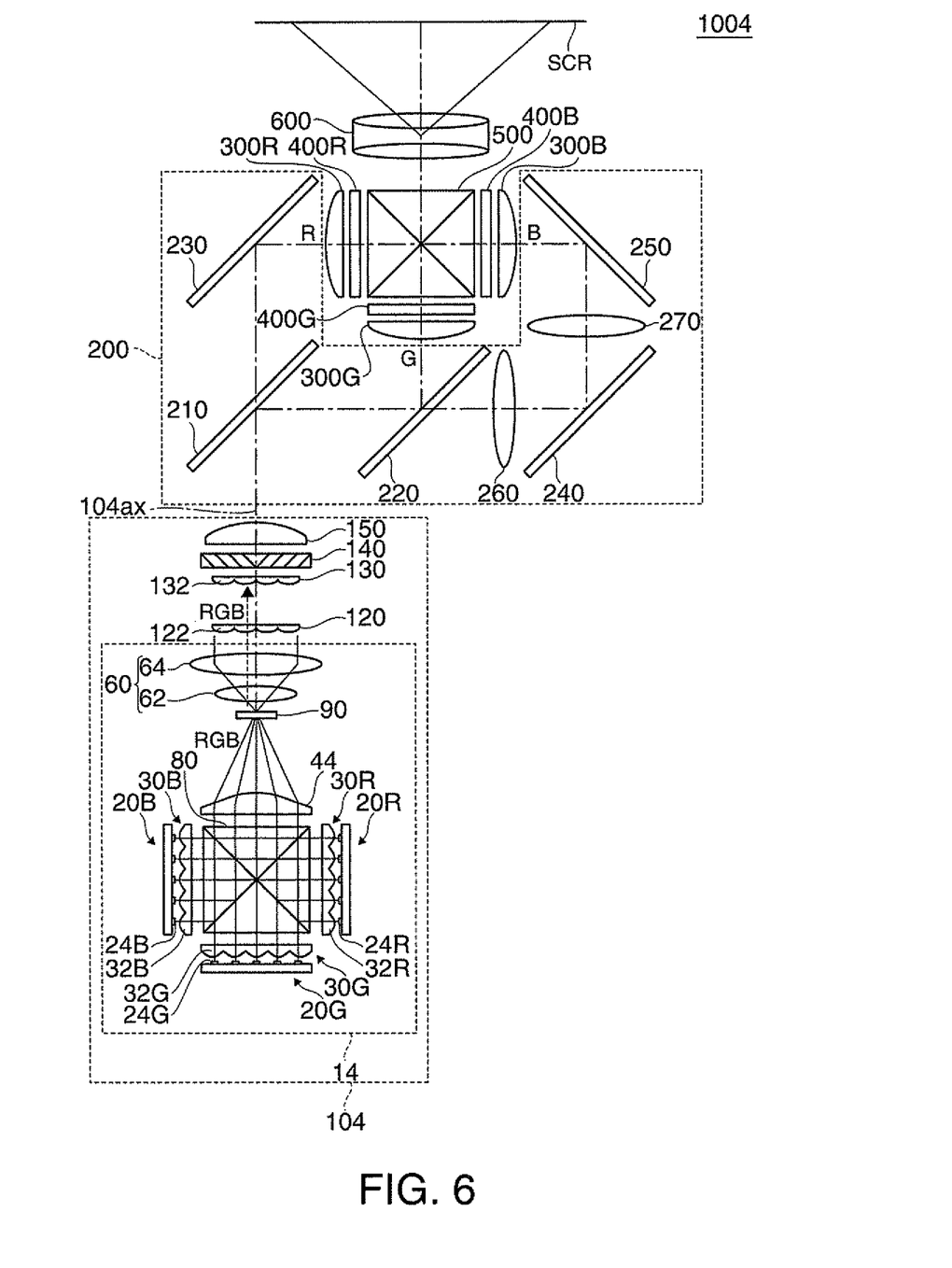
FIG. 6 is a plan view showing an optical system of a projector according to embodiment 3.

FIG. 6 is a plan view showing an optical system of a projector 1004 according to embodiment 3.

Figure 7A:
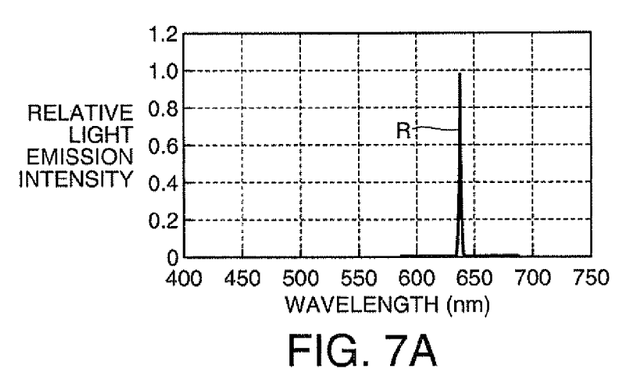
FIGS. 7A to 7C are graphs showing light emission intensity characteristics of a solid-state light source, light emission intensity characteristics of another solid-state light source, and light emission intensity characteristics of the other solid-state light source in embodiment 3.
Figure 7B:
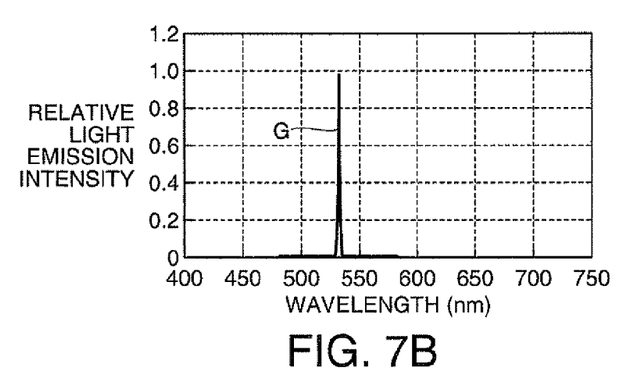
Figure 7C:
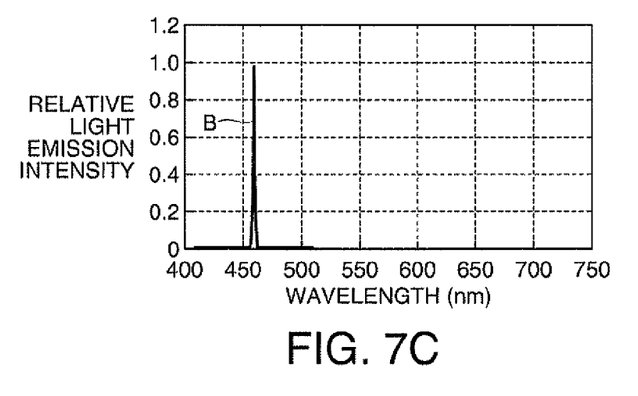

FIGS. 7A to 7C are graphs showing light emission intensity characteristics of a solid-state light source 24R, light emission intensity characteristics of a solid-state light source 24G, and light emission intensity characteristics of a solid-state light source 24B. FIG. 7A is a graph showing the light emission intensity characteristics of the solid-state light source 24R, FIG. 7B is a graph showing the light emission intensity characteristics of the solid-state light source 24G, and FIG. 7C is a graph showing the light emission intensity characteristics of the solid-state light source 24B.

The projector 1004 according to embodiment 3 basically has the same configuration as that of the projector 1000 according to embodiment 1, however, different from the projector 1000 according to embodiment 1 in the configuration of the light source unit. That is, in the projector 1004 according to embodiment 3, as shown in FIGS. 6 and 7A to 7C, a light source unit 14 includes three solid-state light source arrays 20R, 20G, 20B, three collimator lens arrays 30R, 30G, 30B, a cross dichroic prism 80, a focusing system 44, a diverging light generation part 90, and a collimator system 60.

The solid-state light source array 20R and the solid-state light source array 20G have the same configuration as the solid-state light source array 20 in embodiment 1 except that the arrays have a solid-state light source 24R that generates red light (peak of light emission intensity: about 640 nm, see FIG. 7A) and a solid-state light source 24G that generates green light (peak of light emission intensity: about 530 nm, see FIG. 7B), respectively.

The solid-state light source array 20B has a solid-state light source 24B that generates blue light (peak of light emission intensity: about 460 nm, see FIG. 7C), and has the same configuration as the solid-state light source array 20 in embodiment 1.

The three collimator lens arrays 30R, 30G, 303 correspond to the three solid-state light source arrays 20R, 20G, 20B, respectively, and have plural collimator lenses 32R, 32G, 32B that substantially parallelize lights generated by the plural solid-state light sources 24R, 24G, 24B, respectively. The three collimator lens arrays 30R, 30G, 30B basically have the same configuration as the collimator lens array 30 in embodiment 1.

The cross dichroic prism 80 is an optical element that combines red light, green light, and blue light from the three collimator lens arrays 30R, 30G, 303. The cross dichroic prism 80 basically has the same configuration as the cross dichroic prism 500.

The focusing system 44 is a focusing system that focuses the lights from the three collimator lens arrays 30R, 30G, 30B combined by the cross dichroic prism 80 on a predetermined focusing position. The focusing system 44 basically has the same configuration as the focusing system 40 in embodiment 1.

The diverging light generation part 90 has a scattering layer (not shown) that generates scattered light by scattering light from the focusing system 44. The diverging light generation part 90 includes ground glass with fine concavities and convexities as the scattering layer at the exit surface side. The diverging light generation part 90 has a square plate-like shape as a whole. The diverging light generation part 90 is fixed to a predetermined position (see FIG. 6).

Note that, as the diverging light generation part having the scattering layer, a diverging light generation part having a diffractive element as the scattering layer, a diverging light generation part on which scattering paint as the scattering layer (for example, paint containing silica particles or glass beads) is applied, or the like may be used. Further, a diverging light generation part containing scattering particles in a transparent base material and having a function as a scattering layer as a whole may be used.

The collimator system 60 has the same configuration as the collimator system 60 of embodiment 1, and its explanation will be omitted.

As described above, the projector 1004 according to embodiment 3 is different from the projector 1000 according to embodiment 1 in the configuration of the light source unit, however, like the projector 1000 according to embodiment 1, includes an illumination device 104 having the plural solid-state light sources 24R, 24G, 24B as an illumination device and allows the lights from the plural solid-state light sources 24R, 24G, 24B to focus on the incident region in the diverging light generation part 90 by the focusing system 44 and makes the area of the incident region in the diverging light generation part 90 equal to or less than 1/102th of the area of the light modulation region in the light modulation device. Thus, the projector with the higher brightness than that of the projector in related art and with the reduced problem of degradation of the light use efficiency is obtained.

Further, according to the projector 1004 of embodiment 3, since the diverging light generation part 90 has the scattering layer that generates scattered light by scattering light from the focusing system 44, the lights from the plural solid-state light sources 24R, 24G, 24B can be focused on the incident region and diverging light can be generated in the single incident region. Using the illumination device 104, the projector with the higher brightness than that of the projector in related art and with the reduced problem of degradation of the light use efficiency may be formed.

Note that, since the projector 1004 according to embodiment 3 has the same configuration as that of the projector 1000 according to embodiment 1 except the difference in the configuration of the light source device from the projector 1000 according to embodiment 1, the projector has corresponding advantages of the advantages of the projector 1000 according to embodiment 1 as they are.

As described above, the invention has been explained based on the above embodiments, however, the invention is not limited to the above embodiments. The invention may be implemented in various forms without departing from the scope thereof and, for example, the following modifications may be made.

(1) In the embodiments 1 and 2, the solid-state light sources 24 that generate blue light and the phosphor layer that generates phosphor containing red light and green light from part of the blue light have been used, however, the invention is not limited to those. For example, solid-state light sources that generate violet light or ultraviolet light and a phosphor layer that generates color light containing red light, green light, and blue light from the violet light or ultraviolet light may be used. Further, in the respective embodiments, the light source unit has been adapted to output white light as a whole, however, the invention is not limited to that. The light source unit may be adapted to output light other than white light.

(2) In the embodiment 3, the diverging light generation part 90 fixed to the predetermined position has been used, however, the invention is not limited to that. A diverging light generation part that is rotatable around a predetermined rotational axis and has an incident region in a position moving in response to the rotation of the diverging light generation part may be used.

Figure 8:
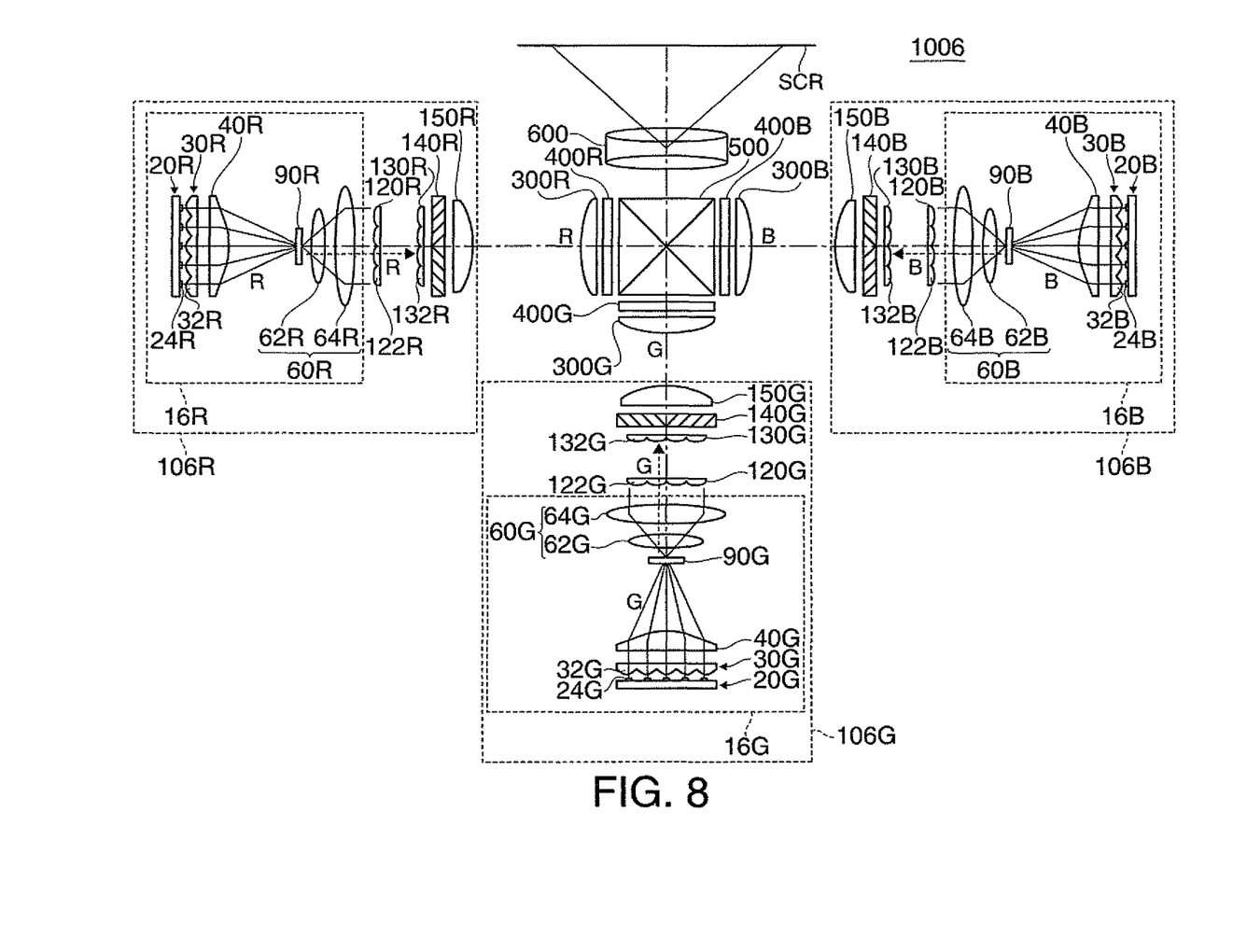
FIG. 8 is a plan view showing an optical system of a projector according to a modified example.

(3) In the embodiment 3, the light source unit 14 including the cross dichroic prism 80 has been used, however, the invention is not limited to that. FIG. 8 is a plan view showing an optical system of a projector 1006 according to a modified example. The projector 1006 according to the modified example basically has the same configuration as that of the projector 1004 according to embodiment 3, however, has light source units 16R, 16G, 16B respectively having no cross dichroic prism. For example, in the case of the above configuration (see FIG. 8), the light source devices with no cross dichroic prism may be used.

(4) In the respective embodiments, the collimator lens having the hyperboloid surface forming the incident surface with the conic constant $Ks_1$ of −2.3 has been used, however, the invention is not limited to those. The collimator lens may be employed as long as the conic constant $Ks_1$ satisfies the condition of $-4 < Ks_1 < -2$.

(5) In the respective embodiments, the collimator lens including the aspherical plano-convex lens having the hyperboloid incident surface and the flat exit surface has been used, the invention is not limited to those. For example, a collimator lens including an aspherical plano-convex lens having a flat incident surface and an ellipsoidal exit surface may be used. Or, in place of the collimator lens including one lens, a collimator lens including plural lenses may be used. In short, a collimator lens that is provided to correspond to the solid-state light source and can substantially parallelize the light generated by the solid-state light sources may be used.

(6) In the respective embodiments, the focusing system having the hyperboloid surface forming the exit surface with the conic constant $Ks_2$ of −2.3 has been used, however, the invention is not limited to those. The focusing system may be employed as long as the conic constant $Ks_2$ satisfies the condition of $-4 < Ks_2 < -2$.

(7) In the respective embodiments, the focusing system including the aspherical plano-convex lens having the flat incident surface and the hyperboloid exit surface has been used, the invention is not limited to those. For example, a focusing system including an aspherical plano-convex lens having an ellipsoidal incident surface and a flat exit surface may be used. Or, in place of the focusing system including one lens, a focusing system including plural lenses may be used. In short, a focusing system that can focus the lights from the collimator lens array on a predetermined focusing position may be used.

(8) In the respective embodiments, the solid-state light source including the semiconductor laser may be used, however, the invention is not limited to those. For example, a solid-state light source including a light emitting diode may be used.

(9) In the respective embodiments, as the diverging light generation part, the so-called transmissive diverging light generation part in which the incident side of the light from the focusing system and the output side of the diverging light are opposite has been used, however, the invention is not limited to those. For example, as the diverging light generation part, the so-called reflective diverging light generation part in which the incident side of the light from the focusing system and the output side of the diverging light are the same may be used.

(10) In the embodiment 1, the transmissive-type projector has been used, however, the invention is not limited to that. For example, a reflective-type projector may be used. Here, "transmissive-type" refers to a type in which a light modulation device as light modulating means transmits light like a transmissive liquid crystal display device or the like, and "reflective-type" refers to a type in which a light modulation device as light modulating means reflects light like a reflective liquid crystal display device or the like. In the case where the invention is applied to the reflective-type projector, the same advantages as those of the transmissive-type projector may be obtained.

(11) In the embodiment 1, the liquid crystal light modulation device has been used as the light modulation device of the projector, however, the invention is not limited to that. As the light modulation device, generally, as long as it may modulate incident light in response to image information, a micromirror light modulation device or the like may be used. As the micromirror light modulation device, for example, a DMD (digital micromirror device) (trademark of TI) may be used. In this case, for the projector including the light source unit as in embodiment 1 or 2, by using a color wheel with divided colors, and, for the projector including the light source unit as in embodiment 3, by sequentially blinking the respective solid-state light sources, color lights that respectively and temporally change may be obtained.

(12) In the embodiment 1, the projector using three liquid crystal light modulation devices has been explained as an example, however, the invention is not limited to that. The invention may be applied to a projector using one, two, four, or more liquid crystal light modulation devices.

(13) The invention may be applied to both a front-projection projector that projects a projection image from an observation side and a rear-projection projector that projects a projection image from an opposite side to the observation side.

The entire disclosure of Japanese Patent Application No. 2010-151841, filed Jul. 2, 2010 is expressly incorporated by reference herein.

What is claimed is:

1. A projector comprising:
an illumination device including plural solid-state light sources, plural collimator lenses that are provided to correspond to the plural solid-state light sources and substantially parallelize lights generated in the plural solid-state light sources, respectively, a focusing system that focuses the lights from the collimator lenses on a predetermined focusing position, and a diverging light generation part that is located near the focusing position and generates diverging light in an incident region where the light from the focusing system enters;
a light modulation device that modulates the light from the illumination device in response to image information in a light modulation region; and
a projection system that projects the light from the light modulation device,
wherein an area of the incident region in the diverging light generation part is equal to or less than 1/102th of an area of the light modulation region in the light modulation device.

2. The projector according to claim 1, wherein the area of the incident region in the diverging light generation part is equal to or more than 1/400th of the area of the light modulation region in the light modulation device.

3. The projector according to claim 1, wherein the solid-state light source includes a semiconductor laser.

4. The projector according to claim 1, wherein the collimator lens includes an aspherical plano-convex lens having a hyperboloid incident surface and a flat exit surface.

5. The projector according to claim 4, wherein, given that a conic constant of the hyperboloid surface forming the incident surface of the collimator lens is $Ks_1$, the conic constant $Ks_1$ satisfies a condition of $-4<Ks_1<-2$.

6. The projector according to claim 1, wherein the collimator lens includes an aspherical plano-convex lens having a flat incident surface and an ellipsoidal exit surface.

7. The projector according to claim 6, wherein, given that a conic constant of the ellipsoidal surface forming the exit surface of the collimator lens is $Kd_1$, the conic constant $Kd_1$ satisfies a condition of $-1<Kd_1<-0.55$.

8. The projector according to claim 1, wherein the focusing system includes an aspherical plano-convex lens having a flat incident surface and a hyperboloid exit surface.

9. The projector according to claim 8, wherein, given that a conic constant of the hyperboloid surface forming the exit surface of the focusing system is $Ks_2$, the conic constant $Ks_2$ satisfies a condition of $-4<Ks_2<-2$.

10. The projector according to claim 1, wherein the focusing system includes an aspherical plano-convex lens having an ellipsoidal incident surface and a flat exit surface.

11. The projector according to claim 10, wherein, given that a conic constant of the ellipsoidal surface forming the incident surface of the focusing system is $Kd_2$, the conic constant $Kd_2$ satisfies a condition of $-1<Kd_2<-0.55$.

12. The projector according to claim 1, wherein the diverging light generation part has a phosphor layer that generates phosphor from a part or whole of the light from the focusing system.

13. The projector according to claim 1, wherein the diverging light generation part has a scattering layer that generates scattered light by scattering the light from the focusing system.

14. The projector according to claim 1, wherein the diverging light generation part is rotatable around a predetermined rotation axis, and
a position of the incident region in the diverging light generation part is moved in response to rotation of the diverging light generation part and along a rotation direction of the diverging light generation part.

* * * * *